United States Patent
Inoue (10) Patent No.: US 8,149,524 B2
(45) Date of Patent: Apr. 3, 2012

(54) OPTICAL SYSTEM AND IMAGE PICKUP APPARATUS HAVING THE SAME

(75) Inventor: Suguru Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/704,076

(22) Filed: Feb. 11, 2010

(65) Prior Publication Data
US 2010/0208366 A1 Aug. 19, 2010

(30) Foreign Application Priority Data
Feb. 17, 2009 (JP) ................................. 2009-033986

(51) Int. Cl.
*G02B 9/12* (2006.01)
(52) U.S. Cl. ......... 359/784; 359/762; 359/770; 359/781
(58) Field of Classification Search .......... 359/754–756, 359/761–763, 770, 771, 781, 784
See application file for complete search history.

(56) References Cited

U.S. PATENT DOCUMENTS

| | | | |
|---|---|---|---|
| 5,315,441 A | | 5/1994 | Hori |
| 5,477,389 A | * | 12/1995 | Ito et al. ........................ 359/752 |
| 5,559,638 A | | 9/1996 | Aoki |
| 5,579,169 A | * | 11/1996 | Mouri ........................... 359/682 |
| 5,805,349 A | | 9/1998 | Sato |
| 2002/0005994 A1 | * | 1/2002 | Shikama ...................... 359/749 |

FOREIGN PATENT DOCUMENTS
JP 2002-303790 A 10/2002

\* cited by examiner

*Primary Examiner* — Darryl J Collins
(74) *Attorney, Agent, or Firm* — Canon U.S.A., Inc. IP Division

(57) ABSTRACT

An optical system includes, in order from an object side to an image side, a first lens having a negative refractive power and having a meniscus shape whose surface on the object side has a convex shape and whose surface on the image side has an aspheric shape, a second lens having a negative refractive power, and a third lens having a negative refractive power. In the optical system, a focal length of the entire optical system (f), a focal length of the first lens (f1), and respective radii of curvature of lens surfaces of the second lens on the object side and on the image side (G2R1, G2R2) satisfy the following conditions:

$$-1.6 < f1/f < -1.2$$

$$0.1 < (G2R1 - G2R2)/(G2R1 + G2R2) < 0.5.$$

7 Claims, 9 Drawing Sheets

OPTICAL SYSTEM AND IMAGE PICKUP APPARATUS HAVING THE SAME

BACKGROUND OF THE INVENTION

1. Field of the Invention

The present invention relates to an optical system useful as a photographic optical system of an image pickup apparatus, such as a silver-halide film camera, a digital still camera, a video camera, a digital video camera, or a TV camera.

2. Description of the Related Art

It has become desirable that a photographic optical system used in a single-lens reflex digital camera and a single-lens reflex film camera has a wide angle of view and a long back focus. As a photographic optical system having a wide angle of view and a long back focus, U.S. Pat. Nos. 5,559,638 and 5,315,441 each discuss a retrofocus type photographic optical system.

In the retrofocus type photographic optical system discussed in each of U.S. Pat. Nos. 5,559,638 and 5,315,441, a lens unit having a negative refractive power (a first lens unit) is provided in a front portion thereof (in a photographic optical system such as a camera, on an object side). In a rear portion of the above-described photographic optical system (in a photographic optical system such as a camera, on an image side), a lens unit having a positive refractive power is provided. The above-described configuration discussed in each of U.S. Pat. Nos. 5,559,638 and 5,315,441 implements a photographic optical system having a wide angle of view and a long back focus.

Japanese Patent Application Laid-Open No. 2002-303790 discusses a retrofocus type photographic optical system whose first lens unit having a negative refractive power includes a plurality of negative lenses and a lens having an aspheric shape to effectively correct off-axis aberration. U.S. Pat. No. 5,805,349 discusses a small size photographic optical system having a long back focus configured by increasing the refractive power of a negative lens of a first lens unit having a negative refractive power, which is located closest to the object side.

Generally, in a retrofocus type photographic optical system, a lens unit having a negative refractive power is provided in front of an aperture stop, and a lens unit having a positive refractive power is provided behind the aperture stop. Therefore, a retrofocus type photographic optical system is asymmetric as a whole.

In addition, in a retrofocus type photographic optical system, in order to achieve a long back focus, an absolute value of the negative refractive power of the front lens unit (the first lens unit) is high. Accordingly, in the retrofocus type photographic optical system described above, a great amount of aberrations may occur.

In particular, as the angle of view becomes wider, the more asymmetric the arrangement of refractive powers may become. More specifically, a large amount of aberrations, such as coma, astigmatism, and spherical aberration, may occur. Furthermore, in a retrofocus type photographic optical system described above, a large amount of off-axis aberrations that have occurred in a first lens unit having a negative refractive power may remain uncorrected. In particular, a large amount of distortion and chromatic aberration of magnification may remain uncorrected.

Accordingly, in a retrofocus type photographic optical system, it is significant to appropriately set the configuration of lenses of the front lens unit (the first lens unit) in order to achieve a photographic optical system having a wide angle of view and a long back focus and capable of capturing a high quality image on the entire image plane.

SUMMARY OF THE INVENTION

According to an aspect of the present invention, an optical system includes, in order from an object side to an image side, a first lens having a negative refractive power and having a meniscus shape whose surface on the object side has a convex shape and whose surface on the image side has an aspheric shape, a second lens having a negative refractive power, and a third lens having a negative refractive power. In the optical system, a focal length of the entire optical system (f), a focal length of the first lens (f1), and radii of curvature of lens surfaces of the second lens on the object side and on the image side (G2R1, G2R2) satisfy the following conditions:

$$-1.6 < f1/f < -1.2$$

$$0.1 < (G2R1 - G2R2)/(G2R1 + G2R2) < 0.5.$$

According to an exemplary embodiment of the present invention, a retrofocus type optical system having a wide angle of view and a long back focus capable of easily capturing a high quality image on the entire image plane.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

Now, an optical system and an image pickup apparatus having the optical system according to an exemplary embodiment of the present invention will be described below. In each exemplary embodiment of the present invention, which will be described in detail below, the optical system includes, in order from an object side to an image side, a first lens having a negative refractive power and having a meniscus shape whose surface on the object side has a convex shape and whose surface on the image side has an aspheric shape, a second lens having a negative refractive power, and a third lens having a negative refractive power.

In each exemplary embodiment, which will be described in detail later below, the optical system includes, in order from the object side to the image side, a first lens unit, an aperture stop, and a second lens unit having a positive refractive power. The first lens unit includes a first lens subunit (a front lens subunit) having a negative refractive power and a second lens subunit (rear lens subunit) having a positive refractive power.

In addition, the first lens subunit includes, in order from the object side to the image side, a first lens having a negative refractive power and having a meniscus shape whose surface on the object side has a convex shape and whose surface on the image side has an aspheric shape, a second lens having a negative refractive power, and a third lens having a negative refractive power.

Figure 1:
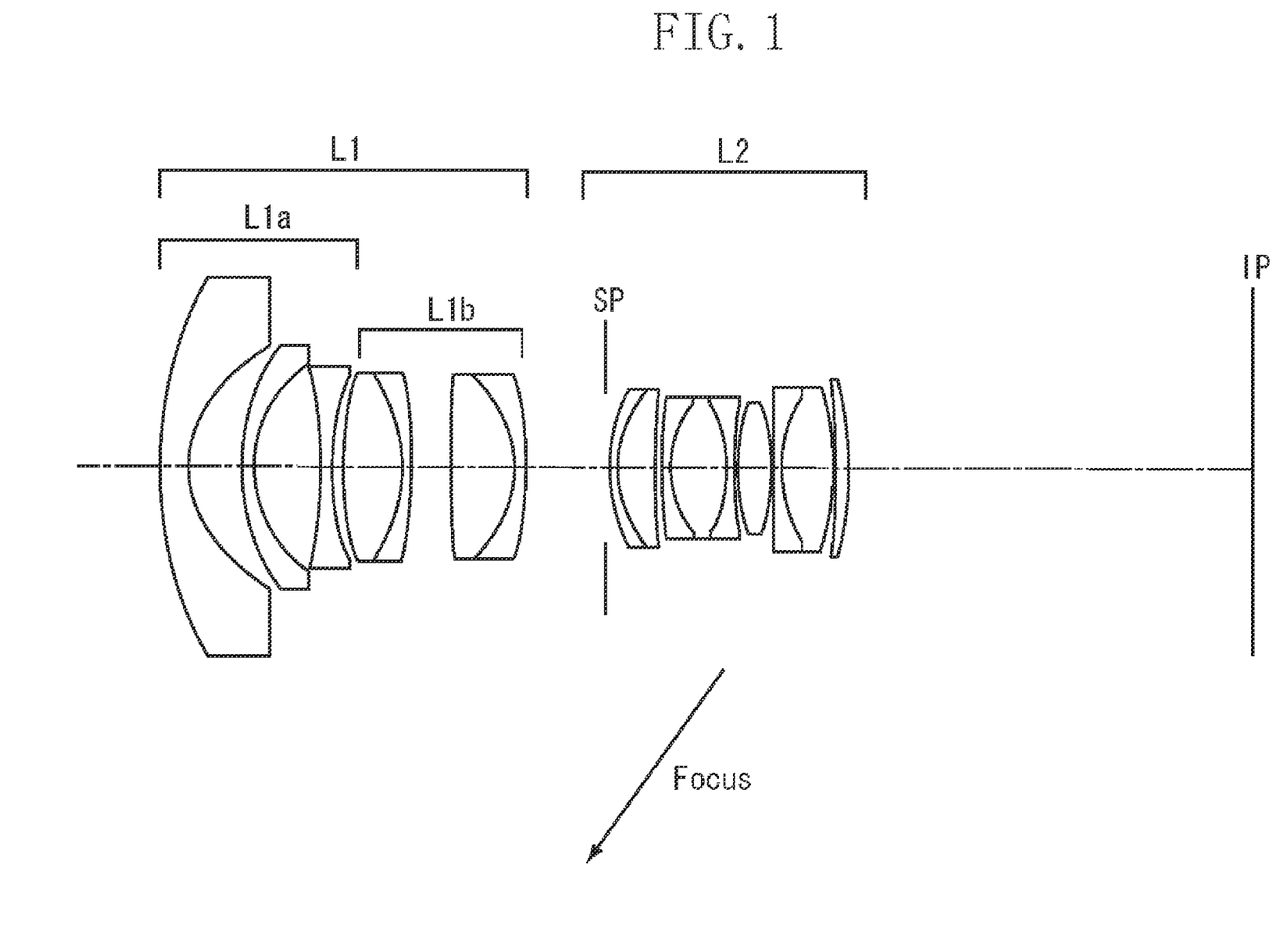
FIG. 1 is a lens cross section of an optical system according to a first exemplary embodiment of the present invention.
Figure 2:
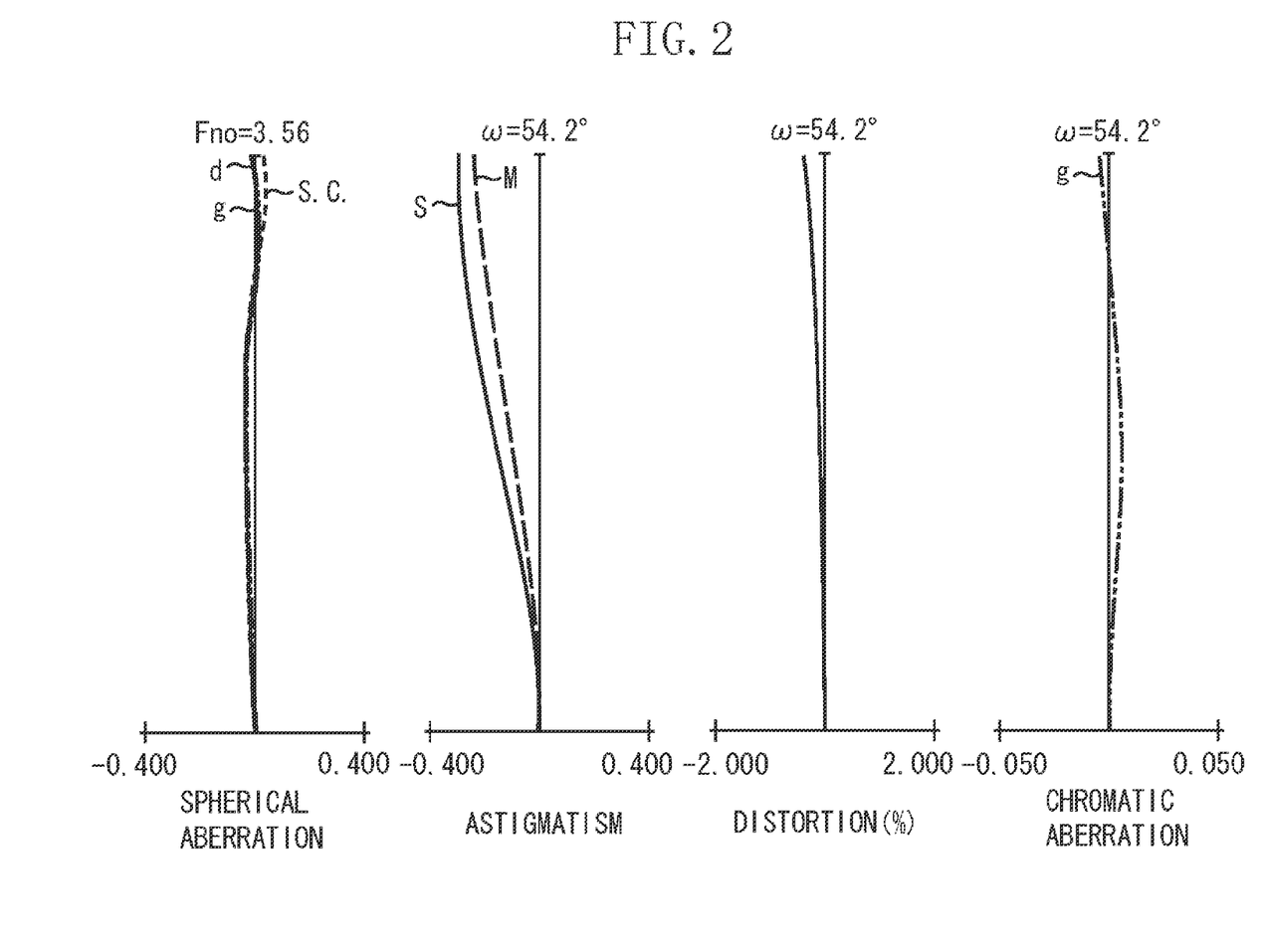
FIG. 2 is an aberration chart of the optical system according to the first exemplary embodiment of the present invention during focusing on an infinitely distant object.

FIG. 1 is a lens cross section of an optical system according to a first exemplary embodiment of the present invention. FIG. 2 is an aberration chart of the optical system according to the first exemplary embodiment during focusing on an infinitely distant object.

Figure 3:
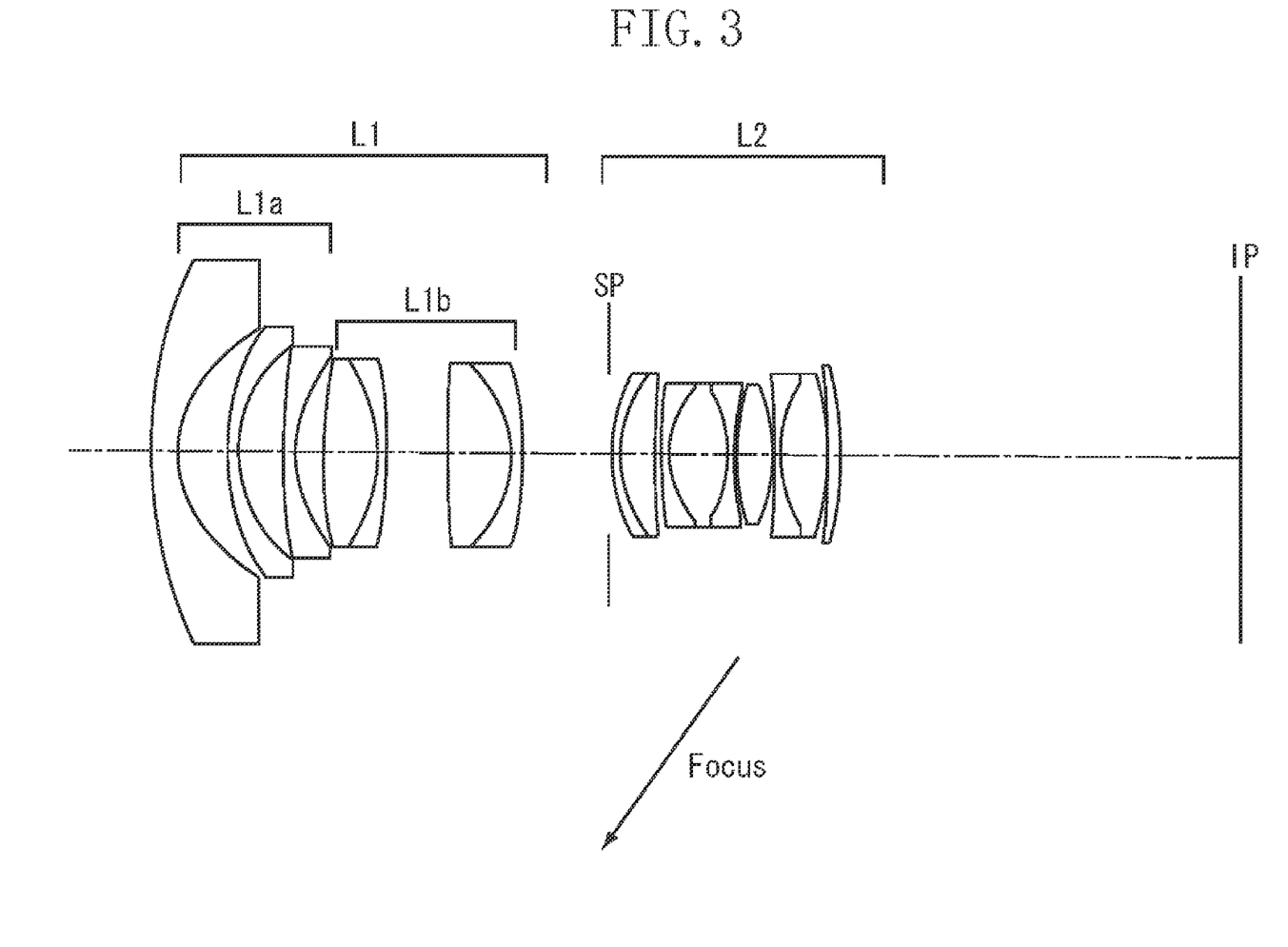
FIG. 3 is a lens cross section of an optical system according to a second exemplary embodiment of the present invention.
Figure 4:
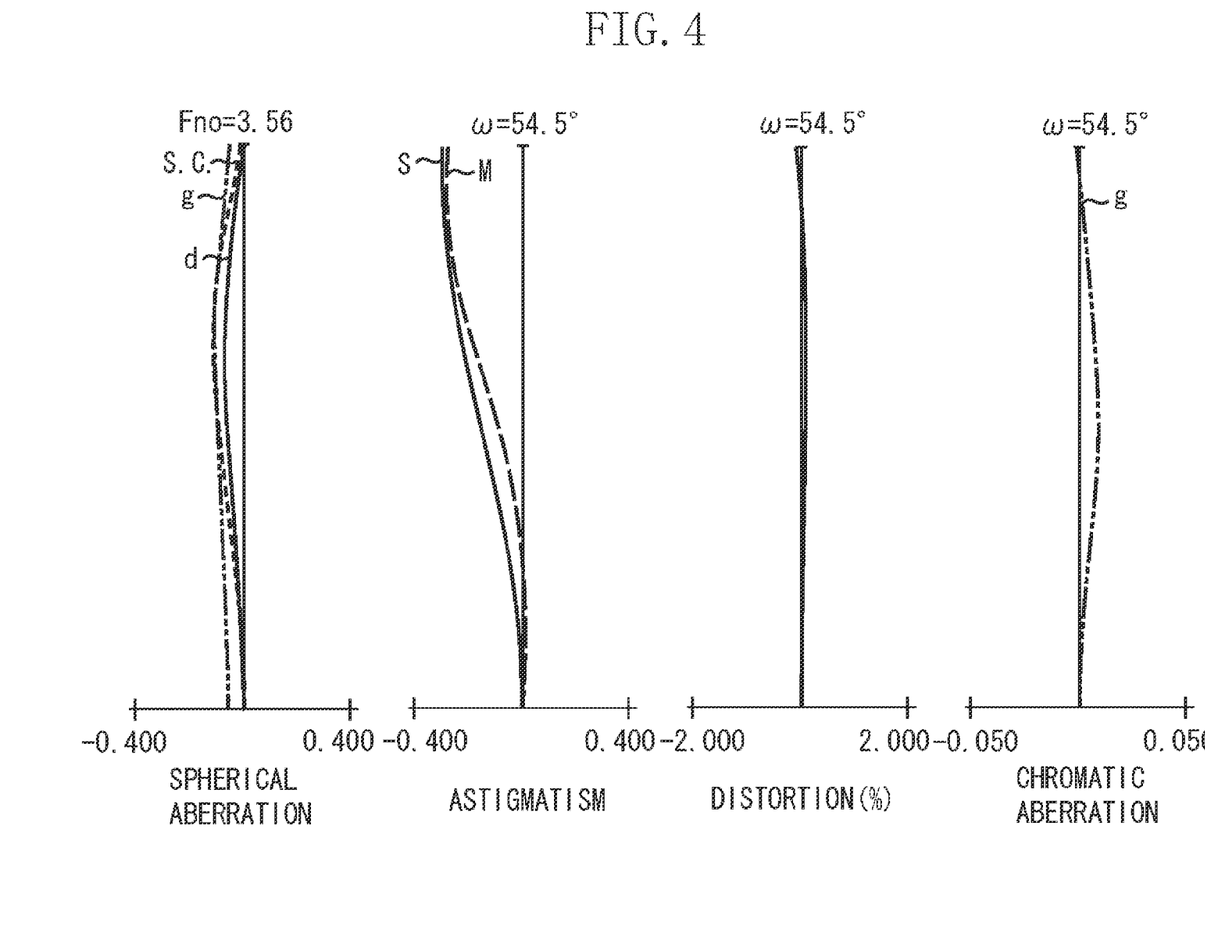
FIG. 4 is an aberration chart of the optical system according to the second exemplary embodiment of the present invention during focusing on an infinitely distant object.

FIG. 3 is a lens cross section of an optical system according to a second exemplary embodiment of the present invention. FIG. 4 is an aberration chart of the optical system according to the second exemplary embodiment during focusing on an infinitely distant object.

Figure 5:
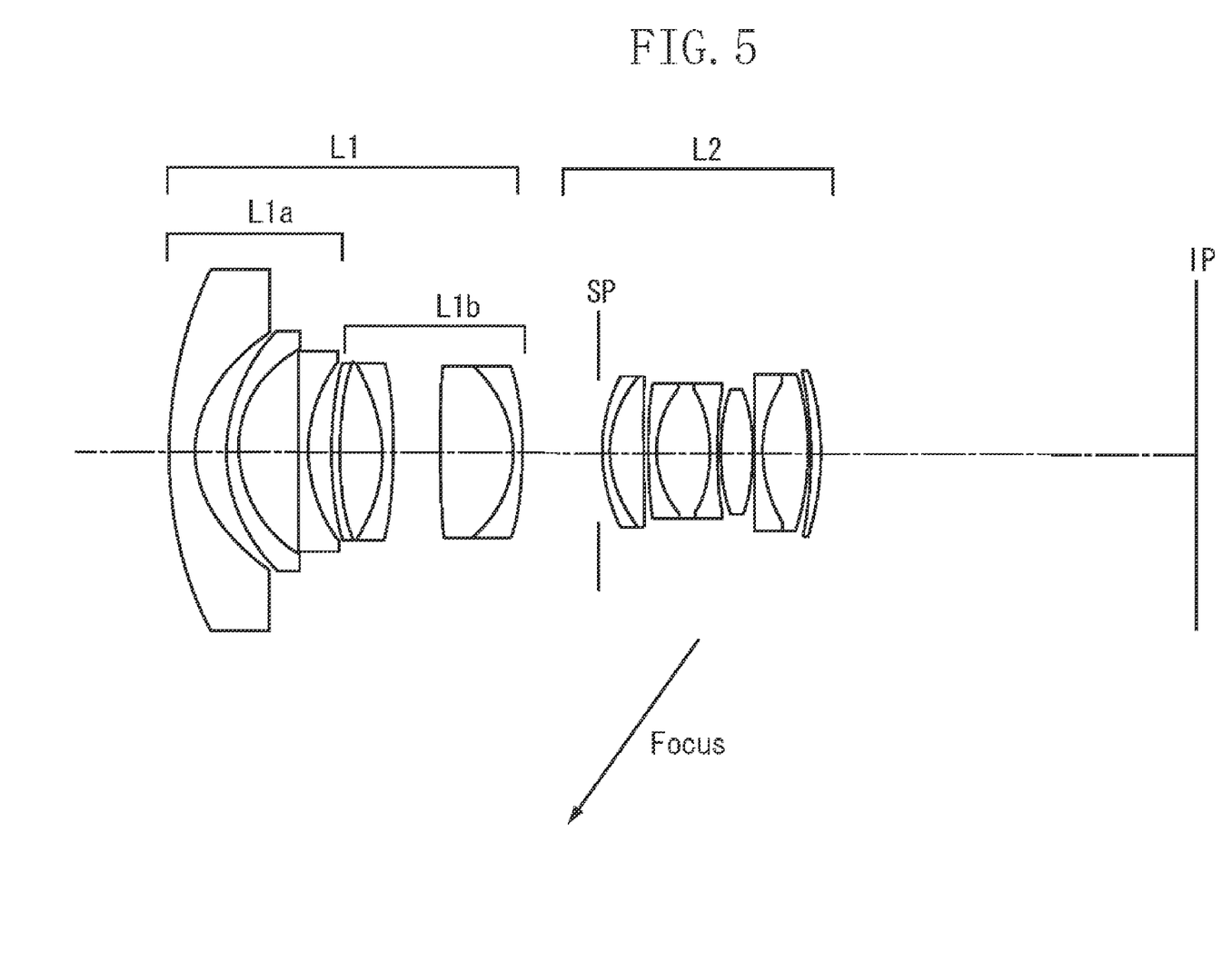
FIG. 5 is a lens cross section of an optical system according to a third exemplary embodiment of the present invention.
Figure 6:
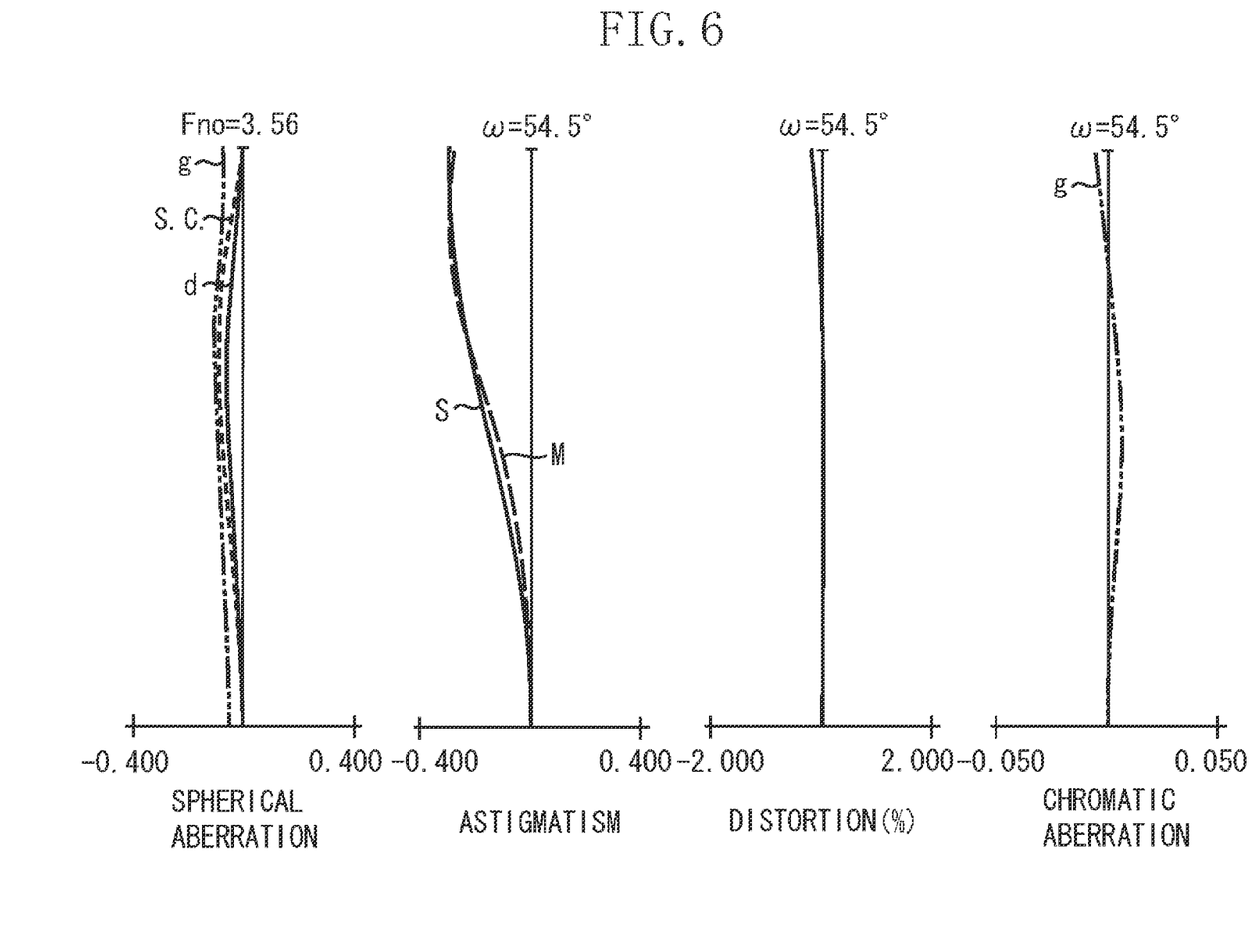
FIG. 6 is an aberration chart of the optical system according to the third exemplary embodiment of the present invention during focusing on an infinitely distant object.

FIG. 5 is a lens cross section of an optical system according to a third exemplary embodiment of the present invention. FIG. 6 is an aberration chart of the optical system according to the third exemplary embodiment during focusing on an infinitely distant object.

Figure 7:
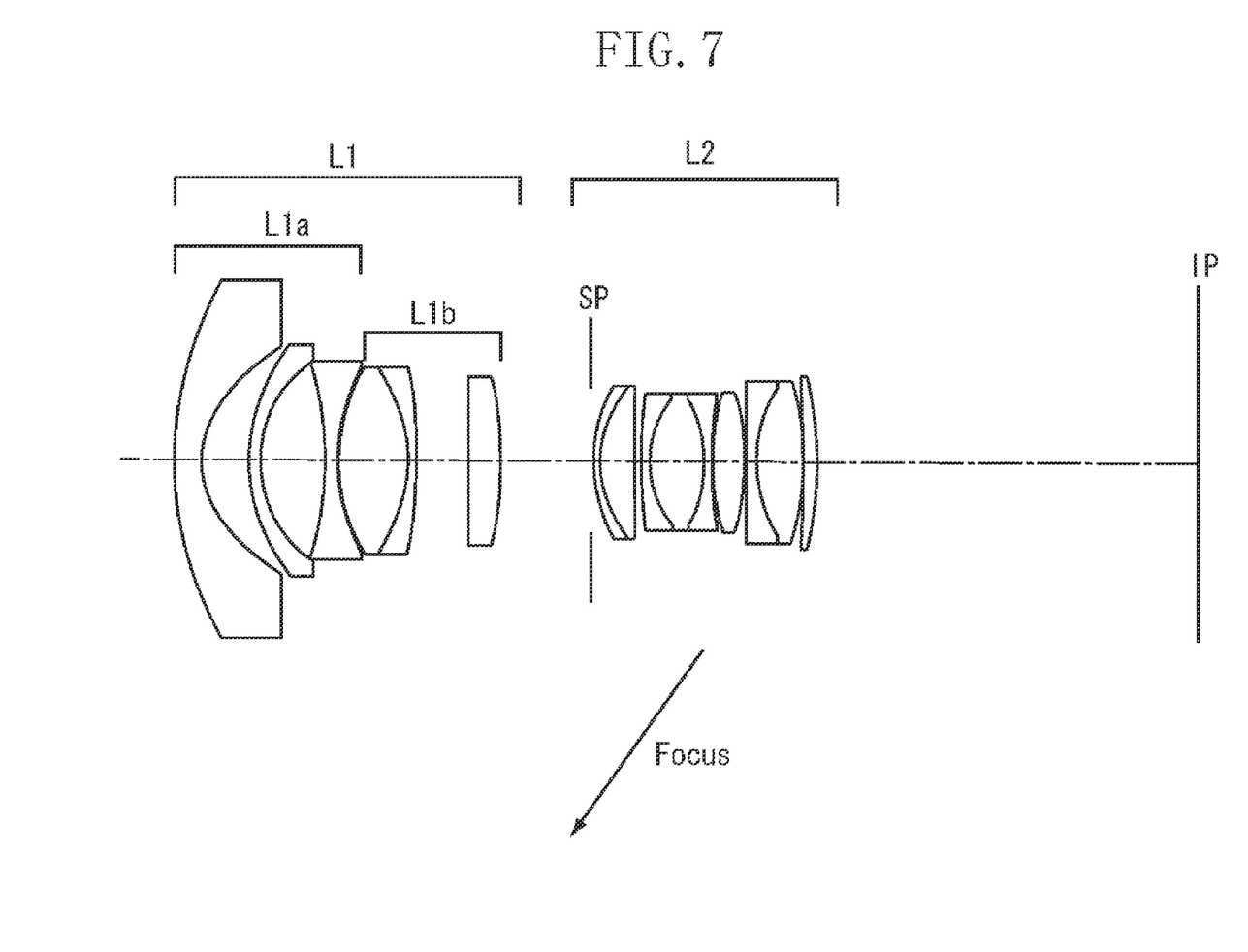
FIG. 7 is a lens cross section of an optical system according to a fourth exemplary embodiment of the present invention.
Figure 8:
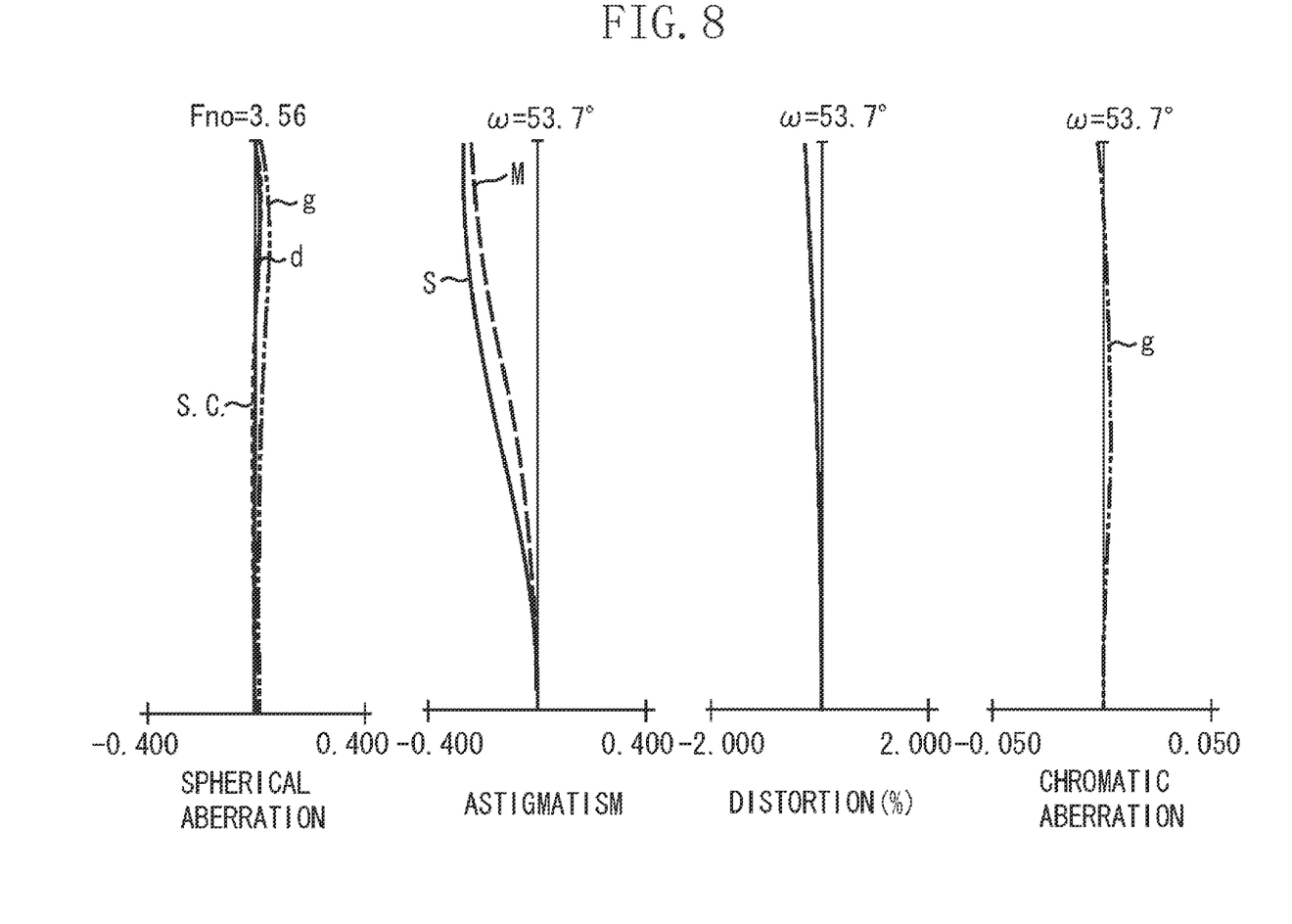
FIG. 8 is an aberration chart of the optical system according to the fourth exemplary embodiment of the present invention during focusing on an infinitely distant object.

FIG. 7 is a lens cross section of an optical system according to a fourth exemplary embodiment of the present invention. FIG. 8 is an aberration chart of the optical system according to the fourth exemplary embodiment during focusing on an infinitely distant object.

Figure 9:
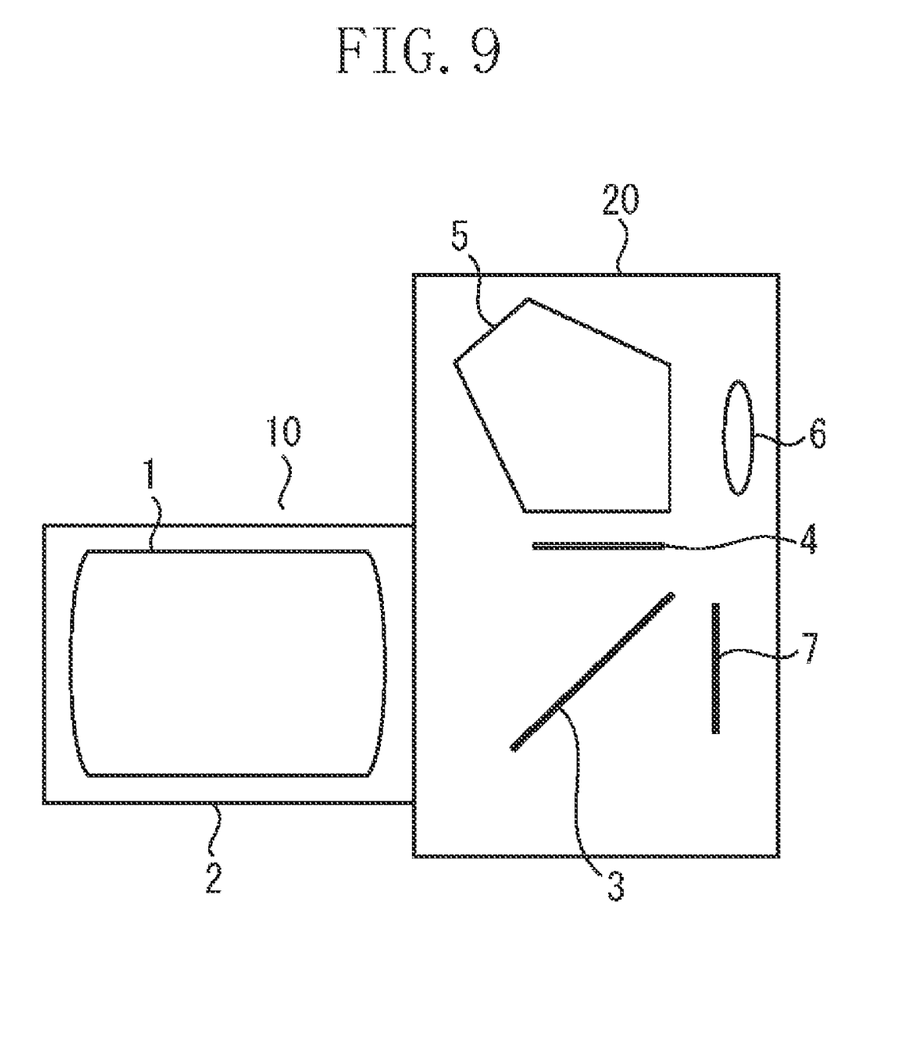
FIG. 9 illustrates exemplary main components of an image pickup apparatus according to an exemplary embodiment of the present invention.

FIG. 9 illustrates exemplary main components of a camera (image pickup apparatus) according to an exemplary embodiment of the present invention. The optical system according to each exemplary embodiment is a photographic optical system used in an image pickup apparatus, such as a video camera, a digital camera, and a silver-halide film camera.

In each of the diagrams showing a cross section of an optical system (FIGS. 1, 3, 5, and 7), the object side (front side) is shown at a left-hand portion of the drawing, and the image side (back side) is shown at a right-hand portion thereof. It is also useful if the optical system according to each exemplary embodiment is used as a projection lens for a projector. If the optical system according to each exemplary embodiment of the present invention is used as a projection lens for a projector, in each of the diagrams showing a cross section of an optical system (FIGS. 1, 3, 5, and 7), the side of a screen is indicated at the left-hand portion of the drawing, and the side of an image to be projected is indicated at the right-hand portion thereof.

In each of the diagrams showing a cross section of an optical system (FIGS. 1, 3, 5, and 7), "i" denotes the order of a lens unit from the object side and "Li" denotes an i-th lens unit. In addition, in each of the diagrams showing a cross section of an optical system (FIGS. 1, 3, 5, and 7), the optical system according to each exemplary embodiment includes a first lens unit L1 having a positive or negative refractive power, a stop (aperture stop) SP, and a second lens unit L2 having a positive refractive power. The term "refractive power" refers to an optical power, which is a reciprocal of the focal length.

"IP" denotes an image plane. The image plane IP is, when the optical system according to an exemplary embodiment of the present invention is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the optical system is used as a photographic optical system of a silver-halide film camera, equivalent to a film surface.

In each of the aberration charts (FIGS. 2, 4, 6, and 8), "d" and "g" respectively denote spherical aberration curves with respect to d-line light and g-line light. "S.C." denotes a sine condition curve. "M" and "S" respectively denote astigmatism curves with respect to a meridional image plane and a sagittal image plane. Chromatic aberration of magnification is represented with g-line light. "Fno" denotes an F-number, and "ω" denotes a half angle of view.

Now, an exemplary configuration of a lens according to exemplary embodiment will be described in detail below.

The optical system according to each exemplary embodiment is a retrofocus type optical system including, in order from the object side to the image side, a first lens unit L1 having a positive or negative refractive power, an aperture stop SP, and a second lens unit L2 having a positive refractive power.

The first lens unit L1 includes a first lens subunit L1a including three negative lenses and having an overall negative refractive power and a second lens subunit L1b including three or four lenses and having an overall positive refractive power. In each exemplary embodiment, the first lens subunit L1a includes, in order from the object side to the image side, a negative lens G1 having a meniscus shape whose surface on the object side has a convex shape and whose surface on the image side has an aspheric shape, a negative lens G2 having a meniscus shape, and a negative lens G3 having a meniscus shape or both of whose surfaces have a concave shape.

The second lens subunit L1b includes a first cemented lens including a positive lens and a negative lens cemented together and having an overall positive refractive power and a second cemented lens including a positive lens and a negative lens cemented together and having an overall positive refractive power. Alternatively, the second lens subunit L1b includes a first cemented lens including a positive lens and a negative lens cemented together and having an overall positive refractive power and a positive lens. The second lens unit L2 includes nine lenses in total, including a cemented lens including three lenses cemented together.

In each exemplary embodiment, a retrofocus configuration is used as the lens configuration of the entire optical system. Accordingly, each exemplary embodiment can prevent the diameter of a front lens from becoming large. Furthermore, with the above-described configuration, each exemplary embodiment can achieve a long back focus.

In each exemplary embodiment, focusing from an infinitely distant object to a closest distance object is executed by moving the second lens unit L2 towards the object side in a manner indicated with an arrow in the drawing (FIGS. 1, 3, 5, and 7). The aperture stop SP is provided on the object side of the second lens unit L2. During focusing, the aperture stop SP moves together with the second lens unit L2.

In each exemplary embodiment, a small-size optical system is achieved by increasing the refractive power of the negative lens G1, which is provided at a location within the optical system closest to the object side, to a relatively high level. In addition, in each exemplary embodiment, a surface of the negative lens G1 on the image side has an aspheric shape. With the above-described configuration, each exemplary embodiment corrects off-axis aberration.

The first lens subunit L1a includes three negative lenses. By appropriately arranging the refractive powers on the three negative lenses, each exemplary embodiment reduces various off-axis aberrations. In addition, in each exemplary embodiment, the positive lens is not provided at a location at which the height of an off-axis ray is relatively high. Accordingly, each exemplary embodiment can reduce distortion and curvature of field.

In addition, the lens surface of the negative lens G1 on the image side has an aspheric shape, with which aspheric shape the level of negative refractive power is lower in the periphery of the lens surface than in the center thereof. The aspheric shape is useful in correcting barrel distortion, which often occurs in a retrofocus type optical system, by offsetting the barrel distortion with a pincushion shape-like correction power.

Distortion can be effectively corrected by employing an aspheric shape for a surface of a lens through which an off-axis ray passes at a high position. Accordingly, in each exemplary embodiment, the surface of the negative lens G1 provided at a location closest to the object side has an aspheric shape.

The height of an off-axis ray passing through the negative lens G1 is higher on the lens surface of the negative lens G1 on the object side than on the lens surface thereof on the image side. However, in each exemplary embodiment, the lens surface on the image side has an aspheric shape.

If the lens surface of the negative lens G1 on the object side is provided with an aspheric shape, with which the level of negative refractive power is lower in the periphery of the lens surface than in the center thereof, then the location of an entrance pupil in the lens surface periphery is located on the image side. In this case, it may become necessary to use a lens having a large diameter or a filter having a large diameter.

By using the negative lens G1 whose surface on the image side has an aspheric shape, it can be prevented that the location of the entrance pupil is located on the image side and it becomes easy to provide a highly aspheric shape on the lens surface. Accordingly, each exemplary embodiment can achieve an optical system whose total size is small and having a high optical performance at the same time.

In addition, each exemplary embodiment uses the first lens subunit L1a having the above-described configuration, through which an off-axis ray passes at a high position therein. Accordingly, each exemplary embodiment can particularly and effectively correct off-axis aberration, such as distortion, on the entire image plane.

Furthermore, in the optical system according to each exemplary embodiment, a focal length of the entire optical system (f), a focal length of the first lens G1 (f1), and respective radii of curvature of lens surfaces of the second lens G2 on the object side and on the image side (G2R1, G2R2) simultaneously satisfy the following conditions:

$$-1.6 < f1/f < -1.2 \qquad (1)$$

$$0.1 < (G2R1-G2R2)/(G2R1+G2R2) < 0.5 \qquad (2).$$

The condition (1) provides a condition for the ratio of the focal length of the first lens G1 to the focal length of the entire optical system. More specifically, the condition (1) primarily provides a condition for effectively balancing between the amount of possible reduction of the total size of the optical system and the improvement of the optical performance of the optical system by appropriately setting the refractive power of the first lens G1.

If the upper limit value of the condition (1) is exceeded, the negative refractive power of the first lens G1 may become too high to correct off-axis aberrations such as distortion or curvature of field. On the other hand, if the lower limit value of the condition (1) is exceeded, then the negative refractive power of the first lens G1 becomes very low. In this case, the effective aperture of the front lens may increase.

In order to further correct aberration in each exemplary embodiment, the range of the value in the condition (1) can be altered as follows:

$$-1.55 < f1/f < -1.27 \qquad (1a).$$

In each exemplary embodiment, the surface of the negative lens G1 on the image side has an aspheric shape as described above. Accordingly, each exemplary embodiment can increase the refractive power of the negative lens G1 to a relatively high level while maintaining a high optical performance at the same time. Furthermore, each exemplary embodiment having the above-described configuration can easily reduce the total size of the optical system.

With respect to the negative lens G2, which is provided the second from the object side, the height of passage of an off-axis ray therethrough is lower than the height of passage of an off-axis ray through the negative lens G1, which is provided at a location closest to the object side. Still, however, in terms of reducing the size of the entire retrofocus lens having a wide angle of view and achieving a high optical performance at the same time, it is significant to appropriately set the shape of the negative lens G2.

The condition (2) provides a condition for the negative lens G2 having a meniscus shape whose surface on the object side has a convex shape. More specifically, the condition (2) provides a condition for reducing the effective aperture of the front lens while reducing distortion at the same time.

If the lower limit value of the condition (2) is exceeded, then the refractive power of the lens decreases. As a result, the first or third lens may have a high refractive power. In this case, the amount of various aberrations may increase.

On the other hand, if the upper limit value of the condition (2) is exceeded, then the level of curvature of the second lens G2 on the image side becomes very high. In this case, negative distortion may increase and it becomes difficult to manufacture the lens.

In order to further correct aberration in each exemplary embodiment, the range of the value in the condition (2) can be altered as follows:

$$0.14 < (G2R1-G2R2)/(G2R1+G2R2) < 0.35 \quad (2a).$$

With the above-described lens configuration, the optical system according to each exemplary embodiment can achieve a high optical performance on the entire image plane, as illustrated in the drawings showing the aberration charts (FIGS. 2, 4, 6, and 8), while achieving a long back focus.

Each exemplary embodiment, which satisfies each of the above-described conditions, achieves an optical system capable of effectively correcting various aberrations in particular, such as axial aberration.

In each exemplary embodiment of the present invention, it is further useful to satisfy at least one of the following conditions. More specifically, it is further useful if a focal length of the second lens G2 (f2), a composite focal length of the first through third lenses G1 through G3 (f13), and an Abbe number and a relative partial dispersion of a material of at least one of the first through third lenses (vd, θgF) satisfy at least one of the following conditions:

$$0.3 < f1/f2 < 0.8 \quad (3)$$

$$-0.7 < f13/f < -0.3 \quad (4)$$

$$0.016 < \theta gF - (0.6438 - 0.001682 \times vd) \quad (5)$$

where the Abbe number vd and the relative partial dispersion θgF can be respectively calculated by the following expressions:

$$vd = (nf-nc)/(nd-1)$$

$$\theta gF = (ng-nf)/(nf-nc)$$

where "ng" denotes a refractive index with respect to g-line light, "nf" denotes a refractive index with respect to F-line light, and "nc" denotes a refractive index with respect to C-line light.

The condition (3) provides a condition for the ratio of the focal length of the first lens G1 to the focal length of the second lens G2. More specifically, the condition (3) provides a condition for appropriately setting the ratio of the refractive power of the first lens G1 to the refractive power of the second lens G2 to primarily and effectively balance between reducing the size of the entire optical system and achieving a high optical performance.

If the lower limit value of the condition (3) is exceeded, then the negative refractive power of the first lens G1 becomes too high compared to the negative refractive power of the second lens G2 to correct off-axis aberration, such as distortion and curvature of field. On the other hand, if the upper limit value of the condition (3) is exceeded, then the negative refractive power of the first lens G1 becomes very low. In this case, the effective aperture of the front lens may increase.

In order to further easily achieve a small-size optical system having a high optical performance in each exemplary embodiment, the range of the value in the condition (3) can be altered as follows:

$$0.43 < f1/f2 < 0.69 \quad (3a).$$

The condition (4) provides a condition for appropriately setting the ratio of the composite focal length of the first lens G1 through the third lens G3 to the focal length of the entire optical system. More specifically, the condition (4) provides a condition for balancedly achieving an optical system having a long back focus and a high optical performance at the same time by appropriately setting the refractive power of a portion of a retrofocus type optical system equivalent to the first lens subunit L1a having a negative refractive power.

If the lower limit value of the condition (4) is exceeded, then the composite negative refractive power of the first lens G1 through the third lens G3 becomes very high. In this case, aberrations such as coma and curvature of field may increase. On the other hand, if the upper limit value of the condition (4) is exceeded, then the composite negative refractive power of the first lens G1 through the third lens G3 becomes too low to achieve a long back focus.

In order to further correct aberration and further easily achieve an optical system having a long back focus in each exemplary embodiment, the range of the value in the condition (4) can be altered as follows:

$$-0.59 < f13/f < -0.35 \quad (4a).$$

The condition (5) provides a condition for appropriately setting characteristics of a material of at least one negative lens of the three negative lenses of the first lens subunit L1a. More specifically, the condition (5) provides a condition for primarily and effectively correcting chromatic aberration of magnification.

In each exemplary embodiment, the relative partial dispersion of any one of the first through the third lenses G1 through G3 satisfies the condition (5). Accordingly, each exemplary embodiment can effectively correct bending of secondary spectrum occurring due to chromatic aberration of magnification. In addition, in each exemplary embodiment, at least one negative lens equivalent to the third lens G3 is used.

In order to further correct chromatic aberration of magnification in each exemplary embodiment, the range of the value in the condition (5) can be altered as follows:

$$0.02 < \theta gF - (0.6438 - 0.001682 \times vd) \quad (5a).$$

Now, an exemplary configuration of an image pickup apparatus having the optical system according to the first through the fourth exemplary embodiments as its photographic optical system will be described in detail below with reference to FIG. 9. FIG. 9 illustrates exemplary main components of a single-lens reflex camera (image pickup apparatus) according to an exemplary embodiment of the present invention.

Referring to FIG. 9, a photographic optical system 10 includes an optical system 1, which is the optical system according to the first through fourth exemplary embodiments. The photographic optical system 1 is supported by a lens barrel 2.

A camera body 20 includes a quick return mirror 3, a focusing screen 4, a pentagonal roof prism 5, and an eyepiece lens 6. The quick return mirror 3 reflects a light flux from the photographic optical system 10 upwards. The focusing screen 4 is provided at an image forming position of the photographic optical system 10. The pentagonal roof prism 5 erects a reverse image formed on the focusing screen 4. The user of the image pickup apparatus can look at the erect image via the eyepiece lens 6.

A solid-state image sensor (photoelectric conversion element), such as a charge-coupled device (CCD) sensor or a complementary metal oxide semiconductor (CMOS) sensor, or a silver-halide film, which receives an image, is provided on an imaging plane 7.

During shooting, the quick return mirror 3 retracts from the optical path and the photographic optical system 10 forms an image on the imaging plane 7. The optical system according to each exemplary embodiment of the present invention can be implemented not only on a digital camera, a video camera, and a silver-halide film camera but also on an optical apparatus, such as a telescope, binocular, a copying machine, or a projector.

Numerical examples 1 through 4, which respectively correspond to the first through fourth exemplary embodiments of the present invention, are set forth below. In each of the numerical examples 1 through 4, "i" denotes the order of each optical surface from the object side, "ri" denotes a radius of curvature of the i-th optical surface, "di" denotes a thickness of the optical member or an air interval between the i-th and (i+1)-th surfaces, "ndi" and "vdi" respectively denote a refractive index and an Abbe number of each optical member with respect to d-line light. "ea" denotes an effective aperture. "BF" denotes a back focus. An optical surface marked with an asterisk ("*") is an aspheric surface.

In addition, each of "A4", "A6", "A8", "A10", and "A12" denotes an aspheric coefficient. The aspheric shape is expressed as $$x=(h^2/R)/[1+\{1-(1+k)(H/R)^2\}^{1/2}+A4 \cdot h^4+A6 \cdot h^6+A8 \cdot h^8+A10 \cdot h^{10}+A12 \cdot h^{12}$$

where "x" denotes a displacement from a surface vertex along the optical axis in a position at a height "h" from the optical axis, and "R" denotes a paraxial radius of curvature. Furthermore, "e$^{-Z}$" denotes "×10$^{-Z}$." In addition, the relationship between each condition described above and various values in each example is set forth in Table 1.

NUMERICAL EXAMPLE 1

Unit: mm

Surface data

| Surface No. | r | d | nd | vd | ea |
|---|---|---|---|---|---|
| 1 | 52.146 | 3.80 | 1.58313 | 59.4 | 49.93 |
| 2* | 13.969 | 7.22 | | | 32.85 |
| 3 | 27.170 | 1.80 | 1.88300 | 40.8 | 31.44 |
| 4 | 16.830 | 8.98 | | | 26.64 |
| 5 | −56.224 | 1.61 | 1.49700 | 81.5 | 25.99 |
| 6 | 33.389 | 1.62 | | | 24.44 |
| 7 | 42.438 | 7.80 | 1.61601 | 58.7 | 24.39 |
| 8 | −23.155 | 1.40 | 1.88397 | 40.8 | 23.70 |
| 9 | −68.614 | 5.35 | | | 23.61 |
| 10 | 163.816 | 8.61 | 1.79600 | 38.1 | 23.65 |
| 11 | −16.580 | 1.48 | 1.77236 | 36.1 | 23.44 |
| 12 | −49.402 | 10.99 | | | 23.00 |
| 13 (Stop) | ∞ | 0.47 | | | 20.09 |
| 14 | 22.758 | 1.20 | 1.78571 | 48.6 | 20.09 |
| 15 | 15.678 | 5.07 | 1.67769 | 31.4 | 19.19 |
| 16 | 93.750 | 0.84 | | | 18.40 |
| 17 | 66.660 | 1.10 | 1.88300 | 40.8 | 17.94 |
| 18 | 14.237 | 7.73 | 1.55400 | 52.2 | 16.74 |
| 19 | −18.230 | 1.00 | 1.84175 | 37.2 | 16.23 |
| 20 | 42.468 | 0.49 | | | 16.31 |
| 21 | 26.259 | 4.67 | 1.49700 | 81.5 | 16.72 |
| 22 | −26.675 | 0.15 | | | 16.75 |
| 23 | 1824.817 | 1.20 | 1.88300 | 40.8 | 17.29 |
| 24 | 18.568 | 7.08 | 1.49700 | 81.5 | 18.50 |
| 25 | −40.152 | 0.15 | | | 21.19 |
| 26 | −110.317 | 1.79 | 1.69895 | 30.1 | 22.22 |
| 27 | −51.090 | Variable | | | 22.90 |
| Image plane | ∞ | | | | |

Aspheric Coefficients

| r2 | k = −6.60488e−001 | A4 = 1.69030e−006 |
|---|---|---|
| | A6 = 5.21355e−011 | A8 = 1.39305e−011 |
| | A10 = −6.83548e−014 | A12 = −1.94007e−017 |

Various Data

| | |
|---|---|
| Focal Length | 24.26 |
| F-number | 3.56 |
| Angle of View | 54.19 |
| Image Height | 33.63 |
| Lens Total Length | 148.52 |
| BF | 54.96 |
| Entrance Pupil Position | 19.25 |
| Exit Pupil position | −29.79 |
| Front Principal Point Position | 36.57 |
| Rear Principal Point Position | 30.69 |

Various Data of Lens Unit

| Lens unit | First surface | Focal length | Lens config. length | Front principal point position | Rear principal point position |
|---|---|---|---|---|---|
| 1 | 1 | 24.26 | 93.57 | 36.57 | 30.69 |

Single Lens Data

| Lens | First Surface | Focal Length |
|---|---|---|
| 1 | 1 | −33.97 |
| 2 | 3 | −54.53 |
| 3 | 5 | −41.90 |
| 4 | 7 | 25.48 |
| 5 | 8 | −40.12 |
| 6 | 10 | 19.32 |
| 7 | 11 | −32.95 |
| 8 | 14 | −69.30 |
| 9 | 15 | 27.07 |
| 10 | 17 | −20.71 |
| 11 | 18 | 15.77 |
| 12 | 19 | −15.04 |
| 13 | 21 | 27.43 |
| 14 | 23 | −21.25 |
| 15 | 24 | 26.61 |
| 16 | 26 | 134.48 |

NUMERICAL EXAMPLE 2

Unit: mm

Surface data

| Surface No. | r | d | nd | vd | ea |
|---|---|---|---|---|---|
| 1 | 59.360 | 3.80 | 1.58313 | 59.4 | 49.86 |
| 2* | 14.323 | 6.14 | | | 33.04 |
| 3 | 27.464 | 1.80 | 1.86300 | 42.2 | 32.12 |
| 4 | 17.908 | 6.17 | | | 27.63 |
| 5 | 82.353 | 1.61 | 1.49700 | 81.5 | 27.01 |
| 6 | 19.449 | 3.62 | | | 24.04 |
| 7 | 53.293 | 7.09 | 1.51695 | 54.9 | 23.85 |
| 8 | −23.441 | 1.40 | 1.88341 | 40.8 | 23.00 |
| 9 | −84.185 | 8.05 | | | 22.94 |
| 10 | 152.176 | 8.89 | 1.78194 | 35.0 | 23.51 |
| 11 | −16.598 | 1.49 | 1.74040 | 28.2 | 23.49 |
| 12 | −40.069 | 11.41 | | | 23.25 |

-continued

| | | | | | |
|---|---|---|---|---|---|
| 13 (Stop) | ∞ | 0.43 | | | 20.63 |
| 14 | 21.105 | 1.20 | 1.88087 | 40.9 | 20.47 |
| 15 | 17.001 | 4.81 | 1.70209 | 29.9 | 19.60 |
| 16 | 526.053 | 0.55 | | | 18.81 |
| 17 | 77.615 | 1.10 | 1.88300 | 40.8 | 18.05 |
| 18 | 12.895 | 8.03 | 1.49421 | 67.4 | 16.30 |
| 19 | −15.290 | 0.95 | 1.85712 | 38.5 | 15.57 |
| 20 | 44.113 | 0.15 | | | 15.74 |
| 21 | 28.590 | 4.83 | 1.49700 | 81.5 | 16.53 |
| 22 | −20.836 | 0.15 | | | 17.33 |
| 23 | −120.939 | 1.20 | 1.88300 | 40.8 | 17.78 |
| 24 | 21.120 | 6.06 | 1.49700 | 81.5 | 18.53 |
| 25 | −35.307 | 0.15 | | | 20.49 |
| 26 | −69.193 | 1.62 | 1.84666 | 23.9 | 21.39 |
| 27 | −40.662 | | | | 22.04 |
| Image plane | ∞ | | | | |

Aspheric Coefficients

| | | | |
|---|---|---|---|
| r2 | k = −5.38986e−001 | | A4 = −6.25833e−006 |
| | A6 = −2.47155e−008 | | A8 = 3.18519e−011 |
| | A10 = −1.85005e−013 | | A12 = −1.94007e−017 |

Various Data

| | |
|---|---|
| Focal Length | 24.00 |
| F-number | 3.56 |
| Angle of View | 54.49 |
| Image Height | 33.63 |
| Lens Total Length | 146.38 |
| BF | 53.70 |
| Entrance Pupil position | 18.90 |
| Exit Pupil Position | −27.64 |
| Front Principal Point Position | 35.82 |
| Rear Principal Point Position | 29.70 |

Various Data of Lens Unit

| Lens unit | First surface | Focal length | Lens config. length | Front principal point position | Rear principal point position |
|---|---|---|---|---|---|
| 1 | 1 | 24.00 | 92.69 | 35.82 | 29.70 |

Single Lens Data

| Lens | First Surface | Focal Length |
|---|---|---|
| 1 | 1 | −33.41 |
| 2 | 3 | −65.35 |
| 3 | 5 | −51.67 |
| 4 | 7 | 32.52 |
| 5 | 8 | −37.18 |
| 6 | 10 | 19.59 |
| 7 | 11 | −39.33 |
| 8 | 14 | −115.00 |
| 9 | 15 | 24.93 |
| 10 | 17 | −17.65 |
| 11 | 18 | 15.63 |
| 12 | 19 | −13.15 |
| 13 | 21 | 25.06 |
| 14 | 23 | −20.28 |
| 15 | 24 | 27.57 |
| 16 | 26 | 113.52 |

NUMERICAL EXAMPLE 3

Unit: mm

Surface data

| Surface No. | r | d | nd | vd | ea |
|---|---|---|---|---|---|
| 1 | 53.969 | 3.80 | 1.58313 | 59.4 | 49.86 |
| 2* | 14.720 | 4.50 | | | 33.64 |
| 3 | 23.423 | 1.80 | 1.88300 | 40.8 | 32.77 |
| 4 | 16.486 | 8.32 | | | 27.88 |
| 5 | 467.434 | 1.60 | 1.49700 | 81.5 | 27.10 |
| 6 | 20.140 | 3.44 | | | 23.84 |
| 7 | 54.952 | 7.09 | 1.49913 | 65.2 | 23.64 |
| 8 | −22.778 | 1.40 | 1.84810 | 43.3 | 22.80 |
| 9 | −71.125 | 6.87 | | | 22.74 |
| 10 | 134.508 | 10.51 | 1.76578 | 34.8 | 23.06 |
| 11 | −15.901 | 1.48 | 1.73347 | 28.6 | 22.94 |
| 12 | −40.128 | 10.67 | | | 22.63 |
| 13 (Stop) | ∞ | 0.43 | | | 20.42 |
| 14 | 21.708 | 1.20 | 1.83400 | 37.2 | 20.29 |
| 15 | 15.873 | 5.02 | 1.70200 | 29.9 | 19.33 |
| 16 | 924.353 | 0.54 | | | 18.58 |
| 17 | 85.645 | 1.10 | 1.88300 | 40.8 | 17.89 |
| 18 | 13.237 | 7.81 | 1.50646 | 62.6 | 16.27 |
| 19 | −15.923 | 0.95 | 1.84603 | 37.8 | 15.58 |
| 20 | 43.562 | 0.50 | | | 15.69 |
| 21 | 27.813 | 4.83 | 1.49700 | 81.5 | 17.02 |
| 22 | −22.853 | 0.15 | | | 17.76 |
| 23 | −150.952 | 1.20 | 1.88300 | 40.8 | 18.15 |
| 24 | 20.268 | 6.44 | 1.49700 | 81.5 | 18.84 |
| 25 | −34.916 | 0.15 | | | 21.04 |
| 26 | −65.887 | 1.56 | 1.84666 | 23.9 | 21.94 |
| 27 | −41.101 | | | | 22.15 |
| Image plane | ∞ | | | | |

Aspheric Coefficients

| | | | |
|---|---|---|---|
| r2 | k = −5.35957e−001 | | A4 = −5.83536e−006 |
| | A6 = −2.27533e−008 | | A8 = 1.98107e−011 |
| | A10 = −1.72180e−013 | | A12 = −1.94007e−017 |

Various Data

| | |
|---|---|
| Focal Length | 24.00 |
| F-number | 3.56 |
| Angle of View | 54.49 |
| Image Height | 33.63 |
| Lens Total Length | 146.99 |
| BF | 53.62 |
| Entrance Pupil position | 19.23 |
| Exit Pupil Position | −28.71 |
| Front Principal Point Position | 36.24 |
| Rear Principal Point Position | 29.62 |

Various Data of Lens Unit

| Lens unit | First surface | Focal length | Lens config. length | Front principal point position | Rear principal point position |
|---|---|---|---|---|---|
| 1 | 1 | 24.00 | 93.37 | 36.24 | 29.62 |

Single Lens Data

| Lens | First Surface | Focal Length |
|---|---|---|
| 1 | 1 | −35.99 |
| 2 | 3 | −71.78 |

-continued

| | | |
|---|---|---|
| 3 | 5 | −42.40 |
| 4 | 7 | 33.27 |
| 5 | 8 | −40.04 |
| 6 | 10 | 19.15 |
| 7 | 11 | −36.86 |
| 8 | 14 | −78.11 |
| 9 | 15 | 22.95 |
| 10 | 17 | −17.86 |
| 11 | 18 | 15.68 |
| 12 | 19 | −13.68 |
| 13 | 21 | 26.07 |
| 14 | 23 | −20.17 |
| 15 | 24 | 26.84 |
| 16 | 26 | 125.43 |

NUMERICAL EXAMPLE 4

Unit: mm

Surface data

| Surface No. | r | d | nd | νd | ea |
|---|---|---|---|---|---|
| 1 | 50.614 | 3.84 | 1.58313 | 59.4 | 48.32 |
| 2* | 13.193 | 6.51 | | | 31.24 |
| 3 | 25.133 | 1.50 | 1.81677 | 40.2 | 30.50 |
| 4 | 16.551 | 9.15 | | | 26.38 |
| 5 | −43.076 | 1.75 | 1.49700 | 81.5 | 25.94 |
| 6 | 26.436 | 0.20 | | | 24.39 |
| 7 | 24.882 | 9.53 | 1.52897 | 63.3 | 24.46 |
| 8 | −21.626 | 1.28 | 1.65384 | 33.5 | 24.01 |
| 9 | −60.928 | 7.01 | | | 24.04 |
| 10 | 409.995 | 4.65 | 1.76954 | 27.0 | 21.94 |
| 11 | −55.034 | 12.34 | | | 21.37 |
| 12 (Stop) | ∞ | 0.47 | | | 19.68 |
| 13 | 19.922 | 1.00 | 1.88111 | 40.6 | 19.93 |
| 14 | 15.922 | 4.61 | 1.70099 | 30.6 | 19.18 |
| 15 | 110.358 | 1.22 | | | 18.50 |
| 16 | 50.278 | 0.90 | 1.85411 | 42.8 | 17.63 |
| 17 | 12.709 | 7.76 | 1.49899 | 67.7 | 16.24 |
| 18 | −17.254 | 0.80 | 1.78837 | 34.9 | 15.65 |
| 19 | 38.533 | 0.15 | | | 16.17 |
| 20 | 25.159 | 4.95 | 1.49700 | 81.5 | 17.34 |
| 21 | −27.602 | 0.15 | | | 18.20 |
| 22 | −192.146 | 1.20 | 1.88324 | 40.8 | 18.72 |
| 23 | 19.374 | 6.50 | 1.49700 | 81.5 | 19.68 |
| 24 | −41.241 | 0.15 | | | 21.33 |
| 25 | −358.016 | 1.90 | 1.84666 | 23.9 | 22.88 |
| 26 | −60.537 | | | | 22.00 |
| Image plane | ∞ | | | | |

Aspheric Coefficients

| r2 | $k = -7.24786e-001$ | $A4 = 7.73295e-006$ |
|---|---|---|
| | $A6 = 1.16253e-008$ | $A8 = 3.50695e-011$ |
| | $A10 = 5.75293e-015$ | $A12 = -1.94007e-017$ |

Various Data

| | |
|---|---|
| Focal Length | 24.01 |
| F-number | 3.56 |
| Angle of View | 53.66 |
| Image Height | 32.63 |
| Lens Total Length | 142.83 |
| BF | 53.33 |
| Entrance Pupil position | 19.07 |
| Exit Pupil Position | −29.07 |

-continued

| | |
|---|---|
| Front Principal Point Position | 36.08 |
| Rear Principal Point Position | 29.32 |

Various Data of Lens Unit

| Lens unit | First surface | Focal length | Lens config. length | Front principal point position | Rear principal point position |
|---|---|---|---|---|---|
| 1 | 1 | 24.01 | 89.50 | 36.08 | 29.32 |

Single Lens Data

| Lens | First Surface | Focal Length |
|---|---|---|
| 1 | 1 | −31.80 |
| 2 | 3 | −64.41 |
| 3 | 5 | −32.69 |
| 4 | 7 | 23.54 |
| 5 | 8 | −51.94 |
| 6 | 10 | 63.33 |
| 7 | 13 | −101.92 |
| 8 | 14 | 26.02 |
| 9 | 16 | −20.13 |
| 10 | 17 | 16.05 |
| 11 | 18 | −15.02 |
| 12 | 20 | 27.33 |
| 13 | 22 | −19.87 |
| 14 | 23 | 27.50 |
| 15 | 25 | 85.80 |

TABLE 1

| | Condition | | | | |
|---|---|---|---|---|---|
| | (1) | (2) | (3) | (4) | (5) |
| First Example | −1.40 | 0.24 | 0.62 | −0.44 | 0.032 (G3) |
| Second Example | −1.39 | 0.21 | 0.51 | −0.53 | 0.032 (G3) |
| Third Example | −1.50 | 0.17 | 0.50 | −0.52 | 0.032 (G3) |
| Fourth Example | −1.32 | 0.21 | 0.49 | −0.41 | 0.032 (G3) |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-033986 filed Feb. 17, 2009, which is hereby incorporated by reference herein in its entirety.

What is claimed is:
1. An optical system comprising, in order from an object side to an image side:
    a first lens unit;
    an aperture stop; and
    a second lens unit having a positive refractive power,
    wherein the first lens unit includes:
        a first lens subunit having a negative refractive power; and
        a second lens subunit having a positive refractive power,
    wherein the first lens subunit includes, in order from the object side to the image side:

a first lens having a negative refractive power and having a meniscus shape whose surface on the object side has a convex shape and whose surface on the image side has an aspheric shape;

a second lens having a negative refractive power; and a third lens having a negative refractive power, wherein a focal length of the entire optical system (f), a focal length of the first lens (f1*l*), and respective radii of curvature of lens surfaces of the second lens on the object side and on the image side (G2R1, G2R2) satisfy the following conditions:

$-1.6 < f1/f < -1.2$ $0.1 < (G2R1-G2R2)/(G2R1+G2R2) < 0.5.$

2. An optical system comprising, in order from an object side to an image side:

a first lens having a negative refractive power and having a meniscus shape whose surface on the object side has a convex shape and whose surface on the image side has an aspheric shape;

a second lens having a negative refractive power; and a third lens having a negative refractive power, wherein a focal length of the entire optical system (f), a focal length of the first lens (f1), and respective radii of curvature of lens surfaces of the second lens on the object side and on the image side (G2R1, G2R2) satisfy the following conditions:

$-1.6 < f1/f < -1.2$ $0.1 < (G2R1-G2R2)/(G2R1+G2R2) < 0.5.$

3. The optical system according to claim 2, wherein a focal length of the second lens (f2) satisfies the following condition:

$0.3 < f1/f2 < 0.8.$

4. The optical system according to claim 2, wherein a composite focal length of the first, second, and third lenses (f13) satisfies the following condition:

$-0.7 < f13/f < -0.3.$

5. The optical system according to claim 2, wherein an Abbe number and a relative partial dispersion of a material of at least one of the first, second, and third lenses (νd, θgF) satisfy the following condition:

$0.016 < \theta gF - (0.6438 - 0.001682 \times \nu d).$

6. The optical system according to claim 2, wherein the optical system is configured to form an image on a photoelectric conversion element.

7. An image pickup apparatus comprising:

the optical system according to claim 2; and a photoelectric conversion element configured to receive an image formed by the optical system.

* * * * *